(12) United States Patent
Lee et al.

(10) Patent No.: US 11,995,779 B2
(45) Date of Patent: May 28, 2024

(54) METHOD, DEVICE, AND SYSTEM FOR MANAGING AND CONTROLLING CONCENTRATION OF USER OF REGISTERED EXTENDED REALITY DEVICE

(71) Applicant: SEVENPOINTONE INC., Seoul (KR)

(72) Inventors: Hyeonjun Lee, Seoul (KR); Juyeong Yoo, Siheung-si (KR)

(73) Assignee: SEVENPOINTONE INC., Seoul (KR)

( * ) Notice: Subject to any disclaimer, the term of this patent is extended or adjusted under 35 U.S.C. 154(b) by 72 days.

(21) Appl. No.: 17/934,367

(22) Filed: Sep. 22, 2022

(65) Prior Publication Data
US 2023/0177782 A1    Jun. 8, 2023

Related U.S. Application Data

(63) Continuation of application No. PCT/KR2022/012502, filed on Aug. 22, 2022.

(30) Foreign Application Priority Data

Dec. 8, 2021   (KR) .................. 10-2021-0174792

(51) Int. Cl.
*G06T 19/00*     (2011.01)
*G06F 3/01*      (2006.01)

(52) U.S. Cl.
CPC .......... *G06T 19/006* (2013.01); *G06F 3/013* (2013.01); *G06T 19/003* (2013.01); *G06F 3/011* (2013.01)

(58) Field of Classification Search
CPC ..... G06T 19/006; G06T 19/003; G06F 3/013; G06F 3/011
See application file for complete search history.

(56) References Cited

U.S. PATENT DOCUMENTS

| | | | |
|---|---|---|---|
| 11,615,600 B1* | 3/2023 | Morgan ................. | G16H 50/20 345/633 |
| 2014/0171039 A1* | 6/2014 | Bjontegard ........... | H04L 67/535 455/414.1 |
| 2018/0136486 A1* | 5/2018 | Macnamara ......... | G02B 27/017 |
| 2019/0114564 A1* | 4/2019 | Ferguson ................ | B64C 39/02 |
| 2019/0324634 A1* | 10/2019 | Gao ....................... | G06T 19/006 |

(Continued)

FOREIGN PATENT DOCUMENTS

| KR | 10-2016-0090065 A | 7/2016 |
|---|---|---|
| KR | 10-2017-0013653 A | 2/2017 |

(Continued)

OTHER PUBLICATIONS

Notice of Allowance mailed by the Korean Patent Office dated Apr. 1, 2022, which corresponds to Korean Patent Application 10-2021-0174792 with English language translation.

*Primary Examiner* — YuJang Tswei
(74) *Attorney, Agent, or Firm* — Studebaker & Brackett PC

(57) ABSTRACT

Disclosed is a method, device, and system that determine the concentration of a user of an XR device where care contents are playing, in a manager terminal and manage and control the XR device based on the determination result. According to an embodiment of the inventive concept, the intended effects may be maximized through care contents of an XR device by managing and controlling a user's concentration of a registered XR device that is playing the care contents.

13 Claims, 15 Drawing Sheets

(56) References Cited

U.S. PATENT DOCUMENTS

2019/0385379 A1* 12/2019 Woo ................... G01C 21/3626
2020/0020171 A1*  1/2020 Hendricks ............. G06T 19/006

FOREIGN PATENT DOCUMENTS

| KR | 10-2017-0143387 A | 12/2017 |
| KR | 10-2019-0015438 A | 2/2019 |
| KR | 10-2019-0125597 A | 11/2019 |
| KR | 10-2019-0140864 A | 12/2019 |
| KR | 10-2020-0063173 A | 6/2020 |
| KR | 10-2155309 B1 | 9/2020 |
| KR | 10-2021-0067451 A | 6/2021 |
| KR | 10-2021-0088898 A | 7/2021 |

* cited by examiner

METHOD, DEVICE, AND SYSTEM FOR MANAGING AND CONTROLLING CONCENTRATION OF USER OF REGISTERED EXTENDED REALITY DEVICE

CROSS-REFERENCE TO RELATED APPLICATIONS

The present application is a continuation of International Patent Application No. PCT/KR2022/012502, filed on Aug. 22, 2022, which is based upon and claims the benefit of priority to Korean Patent Application No. 10-2021-0174792 filed on Dec. 8, 2021. The disclosures of the above-listed applications are hereby incorporated by reference herein in their entirety.

BACKGROUND

Embodiments of the inventive concept described herein relate to the control of an extended reality (XR) device, and more particularly, relate to a method, device, and system for managing and controlling a user's concentration of at least one or more registered XR devices, in each of which care contents are played, in a manager terminal.

With the development of digital technology, interest in virtual space or virtual reality has recently been high, and research on related technologies is being conducted.

The virtual reality technology outputs existing contents in only a virtual space, and thus only the format thereof is changed. However, with the development of the virtual reality technology, attempts have been made to apply the virtual reality technology to various fields.

For example, in a medical field, there is an attempt to develop contents for treating patients.

However, in the case of a conventional virtual reality technology, it is difficult to determine and manage whether a user currently wearing the XR device is properly watching contents when a user directly wears an XR device. Accordingly, it is inconvenient to use the XR device.

SUMMARY

Embodiments of the inventive concept provide a method, device, and system that may determine the concentration of a user of an XR device where care contents are playing, in a manager terminal and may manage and control the XR device based on the determination result.

Problems to be solved by the inventive concept are not limited to the problems mentioned above, and other problems not mentioned will be clearly understood by those skilled in the art from the following description.

According to an embodiment, a method for managing and controlling a plurality of registered XR devices depending on a concentration of a user in a manager terminal includes transmitting a care content playback command to each of the XR devices, receiving gaze coordinate data of the user, who views care contents being played, from each of the XR devices, outputting the care contents being played in each of the XR devices, and a tracking mark based on the received gaze coordinate data of the user on a screen, and transmitting a control signal to a corresponding XR device depending on the concentration of the user of each of the XR devices. The concentration of the user of each of the XR devices is determined based on a difference value between a coordinate value of a current tracking mark of each of the XR devices and a coordinate value of a predefined preset synchronized with a playback time of the care contents. When the care contents are contents repeatedly played at a specific period or series, the concentration of the user of each of the XR devices is determined by using content adaptation determined based on movement data of a tracking mark for each round, and an average value of the movement data. The average value indicates the average value of the movement data of the tracking mark in an entire playback section or a predetermined playback section among the entire playback section. The predetermined playback section includes at least one of an initial section from a playback start point, a specific section before the playback end point, a specific section before and after an important object appears, a specific section set by the manager terminal, or an abrupt section. The concentration of the user of each of the XR devices is determined further with reference to latency information of each of the XR devices. The care contents are set such that a plurality of diagnosis sections including a critical diagnosis section and a non-critical diagnosis section, of which sizes are not uniform, are included depending on an importance. The manager terminal controls a content playback speed of each of the XR devices such that content playback locations of all of the XR devices are matched with each other and thus the concentration of the user is collectively managed when information about a playback location of each of the XR devices is currently received, controls a start of concentration determination of the user when the content playback locations of all the XR devices are matched with each other, and individually controls a playback speed of each of the XR devices such that playback locations of all the XR devices reach, within a predetermined time, a playback location corresponding to a starting point of one diagnosis section of a next diagnosis section of a diagnosis section to which the playback location of an XR device having the latest playback location thus currently received belongs, a next diagnosis section of a diagnosis section to which the playback location of an XR device having the earliest playback location thus currently received belongs, and a next diagnosis section of a diagnosis section to which an average playback location of playback locations, which are currently received, for all of the XR devices belongs.

According to an embodiment, a manager terminal for managing and controlling a plurality of registered XR devices depending on a concentration of a user includes a memory and a processor. The processor transmits a care content playback command to each of the XR devices, receives gaze coordinate data of the user, who views care contents being played, from each of the XR devices, outputs the care contents being played in each of the XR devices, and a tracking mark based on the received gaze coordinate data of the user on a screen, and transmits a control signal to a corresponding XR device depending on the concentration of the user of each of the XR devices. The concentration of the user of each of the XR devices is determined based on a difference value between a coordinate value of a current tracking mark of each of the XR devices and a coordinate value of a predefined preset synchronized with a playback time of the care contents. When the care contents are contents repeatedly played at a specific period or series, the concentration of the user of each of the XR devices is determined by using content adaptation determined based on movement data of a tracking mark for each round, and an average value of the movement data. The average value indicates the average value of the movement data of the tracking mark in an entire playback section or a predetermined playback section among the entire playback section.

The predetermined playback section includes at least one of an initial section from a playback start point, a specific section before the playback end point, a specific section before and after an important object appears, a specific section set by the manager terminal, or an abrupt section. The concentration of the user of each of the XR devices is determined further with reference to latency information of each of the XR devices. The care contents are set such that a plurality of diagnosis sections including a critical diagnosis section and a non-critical diagnosis section, of which sizes are not uniform, are included depending on an importance. The processor controls a content playback speed of each of the XR devices such that content playback locations of all of the XR devices are matched with each other and thus the concentration of the user is collectively managed when information about a playback location of each of the XR devices is currently received, controls a start of concentration determination of the user when the content playback locations of all the XR devices are matched with each other, and individually controls a playback speed of each of the XR devices such that playback locations of all the XR devices reach, within a predetermined time, a playback location corresponding to a starting point of one diagnosis section of a next diagnosis section of a diagnosis section to which the playback location of an XR device having the latest playback location thus currently received belongs, a next diagnosis section of a diagnosis section to which the playback location of an XR device having the earliest playback location thus currently received belongs, and a next diagnosis section of a diagnosis section to which an average playback location of playback locations, which are currently received, for all of the XR devices belongs.

According to an embodiment, a system includes a plurality of XR devices, each of which plays care contents and a manager terminal, in which each of the XR devices are registered, and for managing and controlling each of the XR devices depending on a concentration of a user. The manager terminal transmits a care content playback command to each of the XR devices, receives gaze coordinate data of the user, who views care contents being played, from each of the XR devices, outputs the care contents being played in each of the XR devices, and a tracking mark based on the received gaze coordinate data of the user on a screen, and transmits a control signal to a corresponding XR device depending on the concentration of the user of each of the XR devices. The concentration of the user of each of the XR devices is determined based on a difference value between a coordinate value of a current tracking mark of each of the XR devices and a coordinate value of a predefined preset synchronized with a playback time of the care contents. When the care contents are contents repeatedly played at a specific period or series, the concentration of the user of each of the XR devices is determined by using content adaptation determined based on movement data of a tracking mark for each round, and an average value of the movement data. The average value indicates the average value of the movement data of the tracking mark in an entire playback section or a predetermined playback section among the entire playback section. The predetermined playback section includes at least one of an initial section from a playback start point, a specific section before the playback end point, a specific section before and after an important object appears, a specific section set by the manager terminal, or an abrupt section. The concentration of the user of each of the XR devices is determined further with reference to latency information of each of the XR devices. The care contents are set such that a plurality of diagnosis sections including a critical diagnosis section and a non-critical diagnosis section, of which sizes are not uniform, are included depending on an importance. The manager terminal controls a content playback speed of each of the XR devices such that content playback locations of all of the XR devices are matched with each other and thus the concentration of the user is collectively managed when information about a playback location of each of the XR devices is currently received, controls a start of concentration determination of the user when the content playback locations of all the XR devices are matched with each other, and individually controls a playback speed of each of the XR devices such that playback locations of all the XR devices reach, within a predetermined time, a playback location corresponding to a starting point of one diagnosis section of a next diagnosis section of a diagnosis section to which the playback location of an XR device having the latest playback location thus currently received belongs, a next diagnosis section of a diagnosis section to which the playback location of an XR device having the earliest playback location thus currently received belongs, and a next diagnosis section of a diagnosis section to which an average playback location of playback locations, which are currently received, for all of the XR devices belongs.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
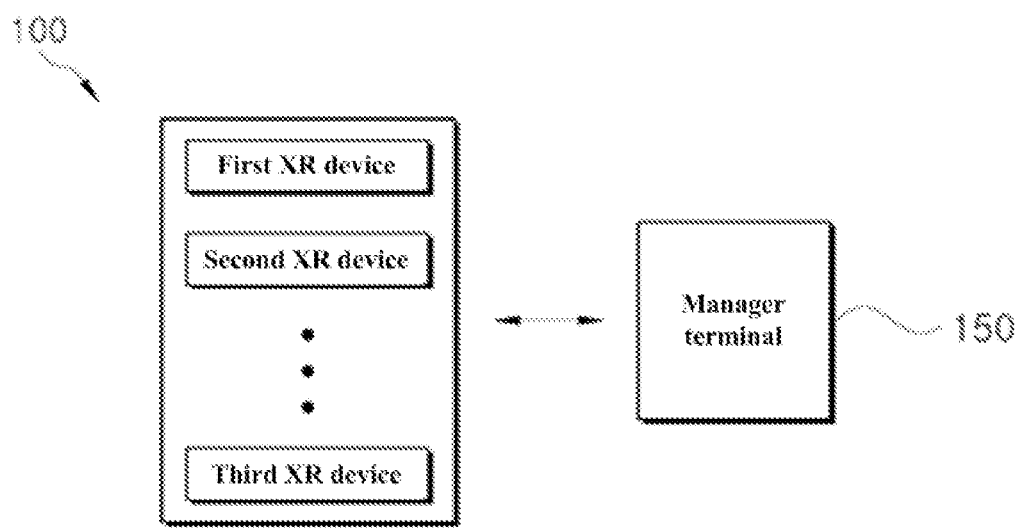
FIG. 1 is a block diagram illustrating a concentration managing and controlling system of an XR device, according to an embodiment of the inventive concept.

The above and other aspects, features and advantages of the inventive concept will become apparent from embodiments to be described in detail in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

As illustrated in the figures, spatially relative terms, such as "below", "beneath", "lower", "above", "upper", and the like, may be used herein for ease of description to describe the relationship between one component and other components. It will be understood that the spatially relative terms are intended to encompass different orientations of the components in use or operation in addition to the orientation depicted in the figures. For example, when inverting a component shown in the figures, a component described as "below" or "beneath" of another component may be placed "above" another element. Thus, the exemplary term "below" may include both downward and upward directions. The components may also be oriented in different directions, and thus the spatially relative terms may be interpreted depending on orientation.

Hereinafter, embodiments of the inventive concept will be described in detail with reference to accompanying drawings.

An XR described in this specification may indicate a term that collectively refers to a technology of virtual reality (VR), augmented reality (AR), and mixed reality (MR). Hereinafter, various embodiments of the inventive concept will be described by using the XR, but not limited thereto. For example, the XR may be used instead of VR, AR, or MR.

Figure 2:
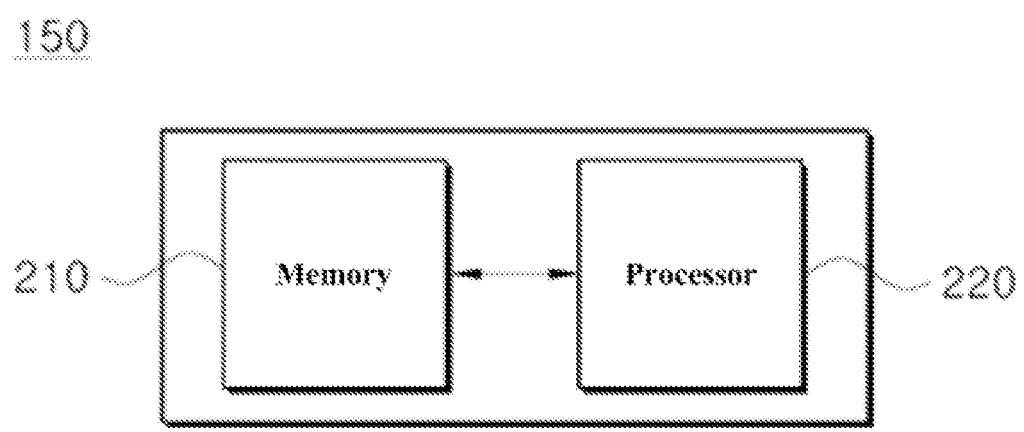
FIG. 2 is a configuration block diagram of a manager terminal, according to an embodiment of the inventive concept.
Figure 3:
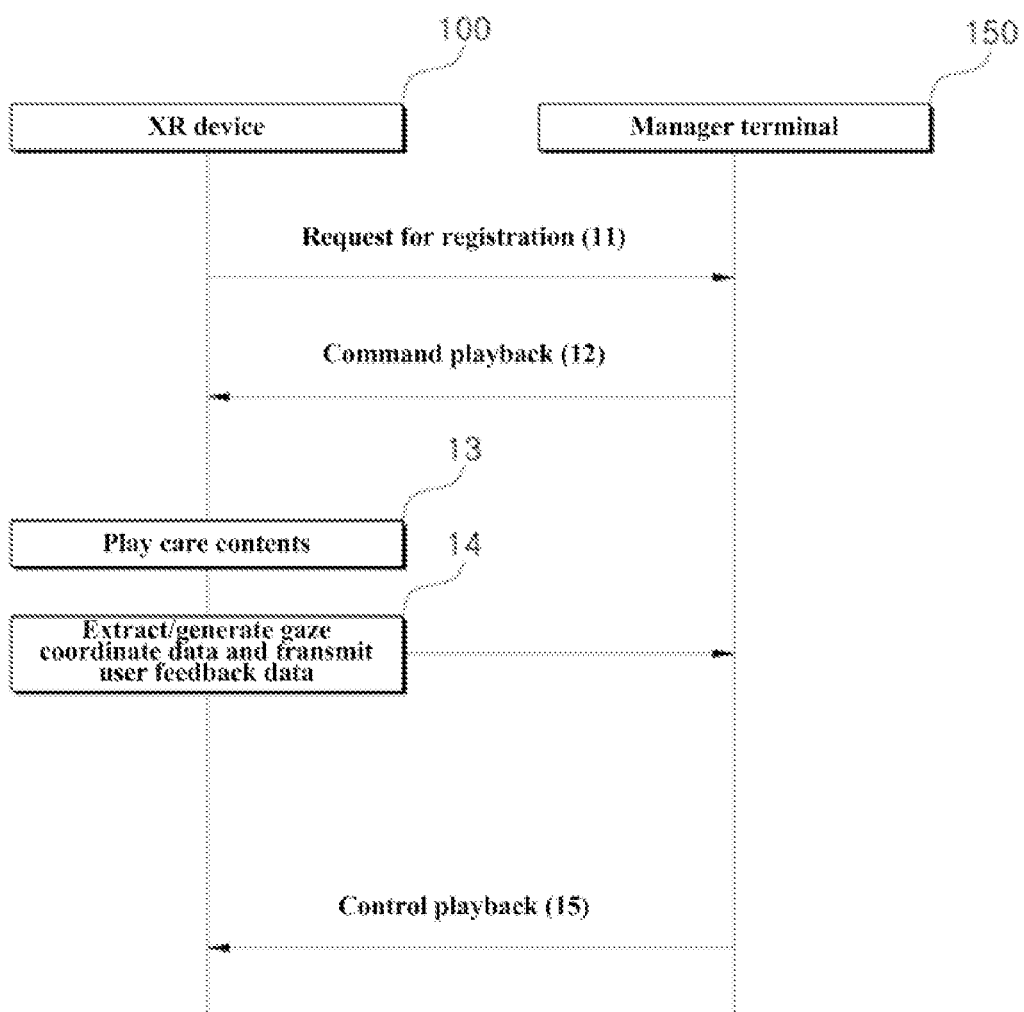
FIG. 3 is a flowchart illustrating an interaction between a manager terminal and an XR device, according to an embodiment of the inventive concept.

FIG. 1 is a block diagram illustrating a concentration managing and controlling system of an XR device, according to an embodiment of the inventive concept. FIG. 2 is a configuration block diagram of a manager terminal 150, according to an embodiment of the inventive concept. FIG. 3 is a flowchart illustrating an interaction between the manager terminal 150 and an XR device 100, according to an embodiment of the inventive concept. FIGS. 4 to 10 are flowcharts illustrating an operation of managing and controlling a concentration of each registered XR device in the manager terminal 150, according to an embodiment of the inventive concept. FIGS. 11A to 13 are views illustrating screens of a user interface for describing an operation of the manager terminal 150 for concentration management and control of an XR device, according to an embodiment of the inventive concept.

Referring to FIG. 1, according to an embodiment of the inventive concept, a concentration managing and controlling system of the XR device may include the XR device 100 and the manager terminal 150. In this case, according to an embodiment, in addition to the XR device 100 and the manager terminal 150 shown in FIG. 1, the concentration managing and controlling system of the XR device may be implemented to further include one or more components in relation to performing the operation according to an embodiment shown in FIGS. 3 to 10.

The XR device 100 provides a user with XR contents (i.e., care contents). In this case, the XR device 100 may be implemented in various forms such as a form (e.g., a head-mounted display (HMD)) worn by the user. In the meantime, detailed descriptions of a configuration of the XR device 100 may refer to a known configuration, and thus separate detailed descriptions thereof will be omitted to avoid redundancy.

In this specification, the user may indicate a viewer who views the care contents while wearing the XR device 100.

Meanwhile, the care contents may be defined as various subjects depending on a user, who views the corresponding contents through the XR device, or the purpose or intent of the contents. For example, when the user is a dementia patient, the care contents may refer to recall contents for relieving the user's dementia symptoms. In addition, when the user is a teenager that suffers from learning difficulties or disabilities, the care contents may refer to psychological counseling contents for relieving the learning difficulties or disabilities. The care contents may be generated as a 360-degree XR image and then may be provided to the user through the XR device 100. According to an embodiment, the care contents may refer to contents repeatedly played at a specific period or series. Meanwhile, the inventive concept is not limited to descriptions given with respect to the above-described care contents.

According to an embodiment, the care contents may also include contents whose difficulty is adjusted with respect to the same contents. On the other hand, even in the case of series or repeated playback contents, even though having the same title, the care contents may include contents having different viewing difficulties.

In the specification, when only an 'XR device' is defined and described, it may indicate only one XR device. However, as shown in FIG. 1, 'n' XR devices (here, 'n' is a natural number) may be shown. It may be interpreted as the meaning of a context. In the latter case, when 'n' is a natural number greater than or equal to 2, it is not necessary for each XR device to have the same performance, type, or version. It is possible to provide a user with the care contents according to an embodiment of the inventive concept, and to perform an operation according to a control signal by the manager terminal 150 to be described later.

In the meantime, the care contents may be stored in advance in a storage space such as a SD card removable from the XR device 100 or a memory built into the XR device 100 or may be downloaded from the manager terminal 100 or the user's personal terminal and then stored in the storage space.

The XR device 100 may provide the user with the care contents such that the user views the care contents in the XR space depending on the control signal of the manager terminal 150. In the meantime, even though there is no control of the manager terminal 150, the XR device 100 may randomly play the care contents under the user's control. However, even in the case of the random playback, the XR device 100 may notify the manager terminal 150 that the care contents are being randomly played in the corresponding device under the user's control. Under the control of the manager terminal 150, the playback of the care contents thus randomly played may be controlled.

The XR device 100 may refer to a device that is normally worn on the user's head, and may detect or track the user's head movement during the playback of the care contents based on sensing data obtained through a sensor such as a built-in acceleration sensor. The XR device 100 may track the gaze movement of the user watching the care contents based on the tracked head movement of the user in the XR space, may generate gaze coordinate data for tracking the user's gaze movement, and may transmit the generated gaze coordinate data to the manager terminal 150. The manager terminal 150 may generate a tracking mark based on the transmitted gaze coordinate data of the XR device 100.

Besides, in a process of providing the care contents in the XR space, the XR device 100 may obtain the user's feedback data related to the care contents and may transmit the user's feedback data to the manager terminal 150. In this case, for example, the user's feedback data may include answer data for a question, which is included in the care contents being played in the XR space or which is linked depending on a playback section. The answer data may be in a form of a voice, a gesture, or the like, but is not limited thereto. In the meantime, when the user's feedback data received from the XR device 100 is a voice, the manager terminal 150 may convert the voice to a text through a speech-to-text (STT) module and may analyze and process the user's feedback data.

Figure 12A:
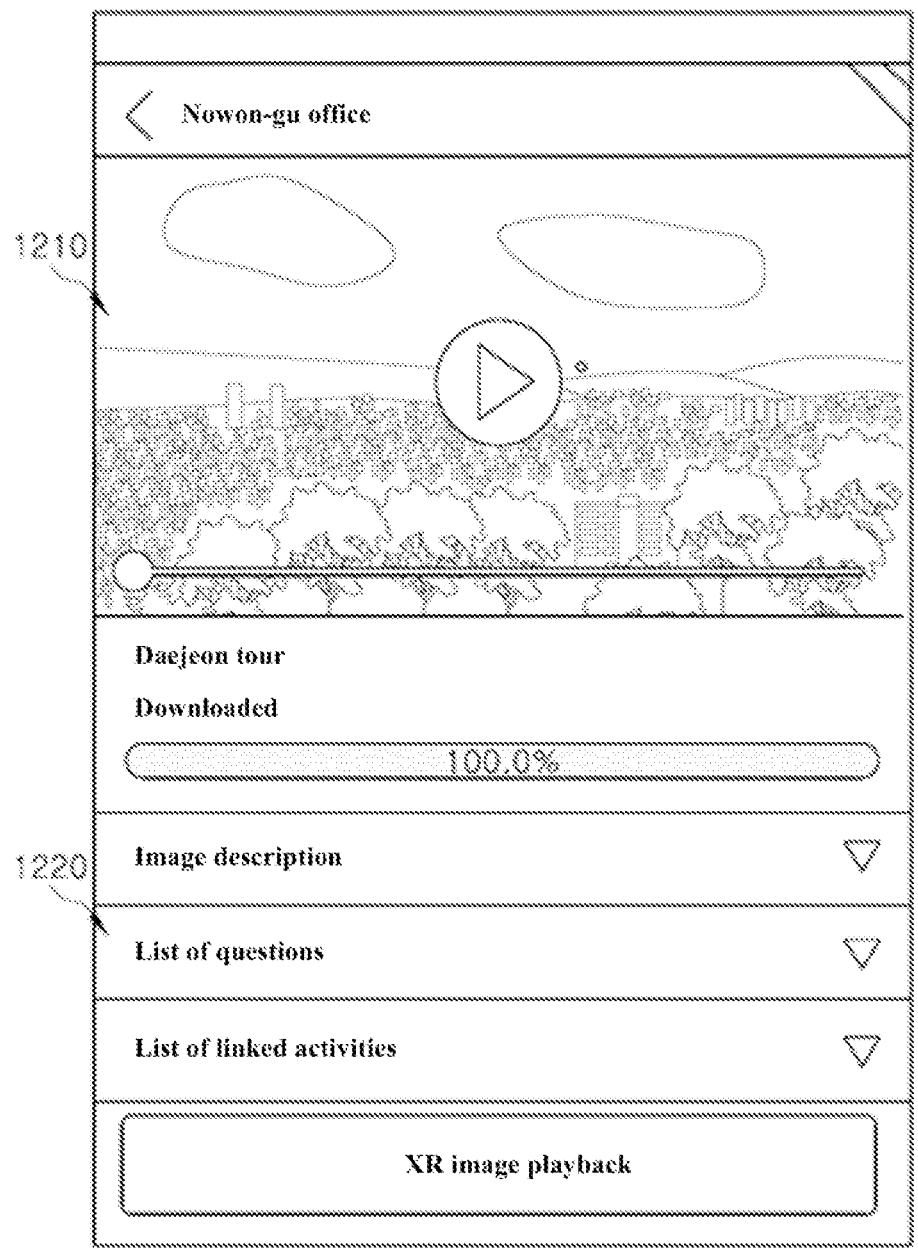

Referring to FIGS. 1 and 2, the manager terminal 150 includes a memory 210 and a processor 220. In this case, in this specification, for the purpose of helping the understanding of the inventive concept and for convenience of description, it is described that the manager terminal 150 is a terminal other than an XR device, but is not limited thereto. In the meantime, as shown in FIGS. 12A to 13 to be described later, the manager terminal 150 may output a playback screen of the care contents being currently played by each XR device. At this time, the output playback screen of the care contents may be provided in a form of a 2D or 3D image depending on a shape of the terminal. For example, the manager terminal 150 may be one of a TV, a monitor, a signage, a PC, a laptop computer, a tablet PC, a smartphone, and a wearable device. According to another embodiment, the manager terminal 150 may be a dedicated apparatus for controlling at least one or more registered XR devices.

The manager terminal 150 does not need to be located in a location adjacent to the registered the XR device 100. However, the manager terminal 150 may be present remotely. In this regard, according to an embodiment, the manager terminal 150 may be in a form of a server or cloud, which has a remote control purpose, but is not limited thereto. In the meantime, according to an embodiment, the manager terminal 150 may be referred to as "various names", such as a controller, a control unit, and a computing device.

The manager terminal 150 may directly create the care contents. In this case, to play the care contents in the registered XR device 100, the manager terminal 150 may upload the care contents or may directly transmit the care contents to the corresponding XR device.

Figure 12B:
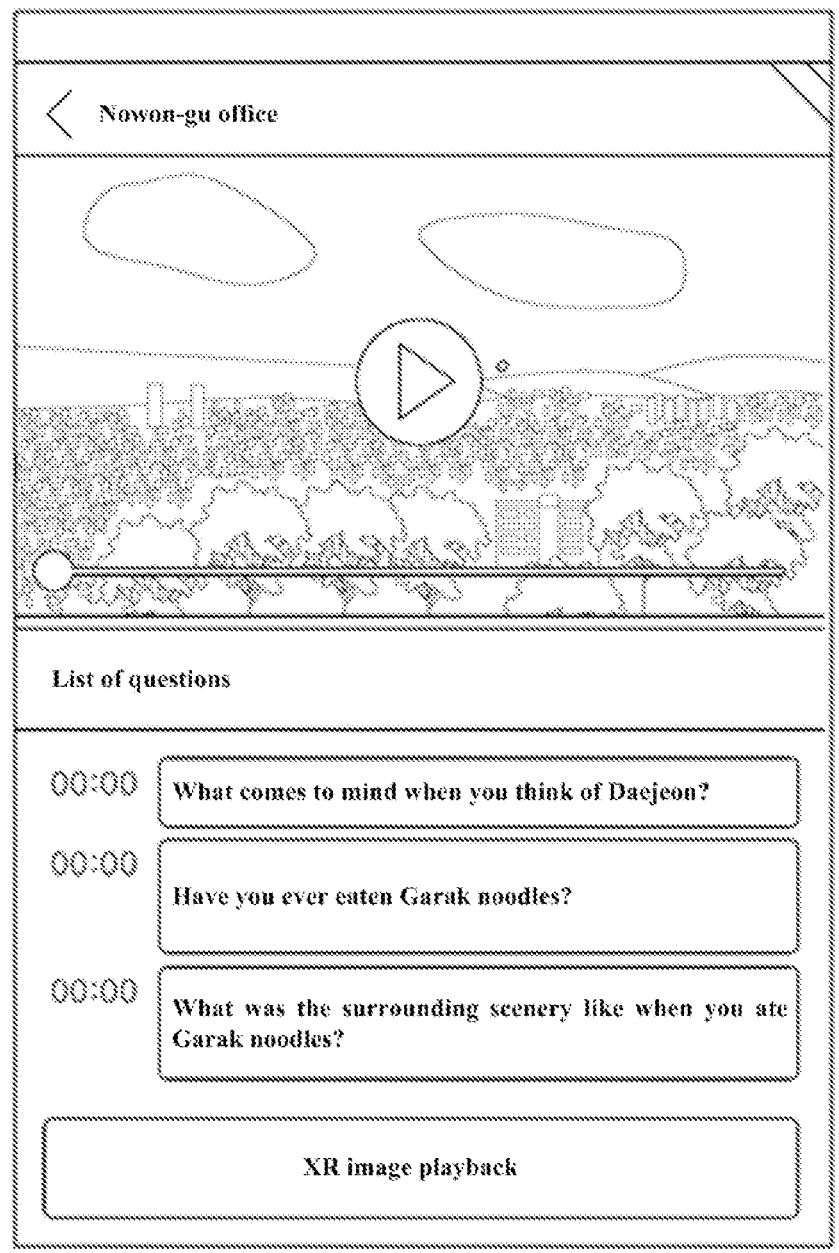
Figure 13:
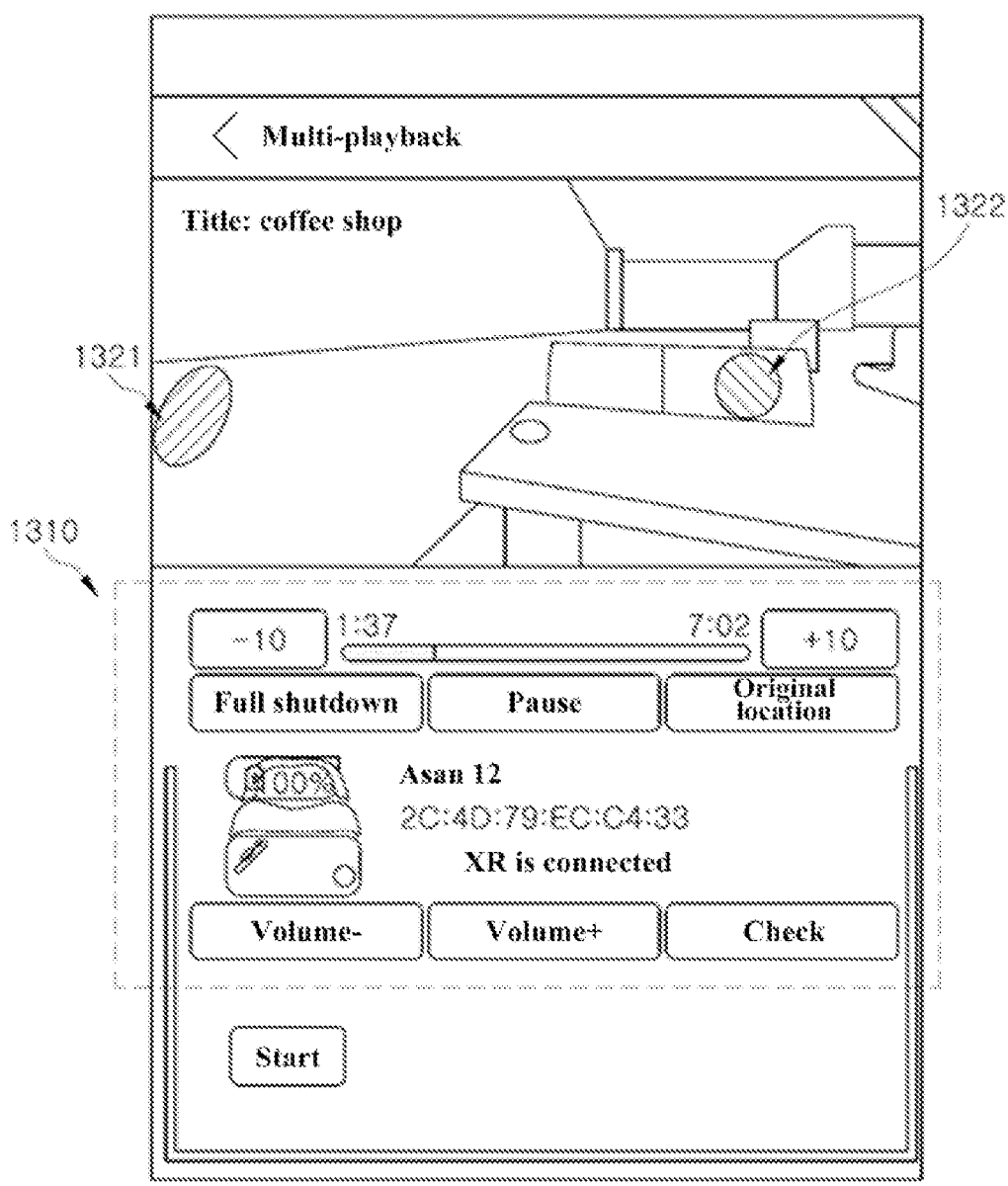

In the meantime, for example, the screen of the manager terminal 150 may be displayed as shown in FIGS. 12A and 12B, but is not limited thereto.

Referring to FIG. 12A, a screen of the manager terminal 150 may be divided into an image display region 1210 and a function region 1220.

In this case, the screen of the care contents being currently played in at least one or more registered XR devices may be provided to the image display region 1210. The manager terminal 150 may directly control the playback of the care contents through the image display region 1210. Besides, as shown in FIG. 13, tracking marks 1321 and 1322 based on the user's viewing coordinate data received from each XR device may be provided to the image display region 1210. In this case, for convenience of description, in FIG. 13, the two tracking marks 1321 and 1322 are provided. However, according to the embodiment, even one tracking mark may not be provided, or three or more tracking marks may be provided. Accordingly, in addition to the reaction and appreciation of a user of each XR device for the care contents, the manager terminal 150 may evaluate the user's concentration in consideration of various situations through the tracking marks 1321 and 1322 and may also assist control or the like.

In the meantime, the function region 1220 may include an image description region, a question list, a feedback region, and a linked activity region. Besides, the screen of the manager terminal 150 may include various interfaces such as a title of contents being provided to the image display region, a download status, and a button for controlling care contents played in a specific XR device.

The image description region of the function region 1220 refers to a region in which overall information about an image is provided. For example, information about a playback time of care contents, a capacity of the care contents, a training purpose (e.g., which region of a brain will be trained, what disease will be treated, or the like) of the care contents, a planning intent of the care contents, a subject of the care contents, and what to do as a linked activity may be provided to the image description region.

As shown in FIG. 12B, the question list and feedback region of the function region 1220 are regions in each of which a question list provided through narration and a feedback such as a user's answer to the question list are provided in a specific time zone of the care contents. For example, as described above, the user's feedback may be automatically extracted and recorded through the STT module in the manager terminal 150.

Referring to FIG. 12B, with regard to the care contents being played in the XR device 100, the manager terminal 150 may provide a question list and a tag answer to the question list. Accordingly, a user watching care contents through the XR device 100 may easily and conveniently answer the question list. In addition, the manager terminal 150 may easily and quickly obtain and record the user's feedback data.

In the meantime, the tag answer may be implemented differently for each question. For example, the user's reaction and the convenience of the usage of care contents may be improved by providing a type of a sample answer such as "Yes/No" indicating simple affirmation or negation, "an answer after 1/2/3/4/5 seconds" indicating a reaction speed of the answer, and "I met/I went to/I ate/I like ~" indicating the specific intent or purpose such as recall.

According to an embodiment, the tag answer may be composed of data for diagnosing a user or identifying the tendency of a user so as to be suitable for the purpose of the care contents.

According to an embodiment, the manager terminal 150 may refer to the tag answer to recommend or provide customized contents later based on the feedback data. For example, the manager terminal 150 may control playback such that integrated contents are initially provided to a user in an XR space through the XR device 100. However, when various answer data is obtained through the playback of such contents, the manager terminal 150 may control the XR device 100 such that care contents, which are specialized and customized according to the user's tendency of the XR device 100, are provided based on the various answer data.

For example, with regard to the customized contents specialized for the tendency of a user employing an XR device, when a user answers "bicycle" to a question saying that "what kind of exercise do you like" (example 1), the manager terminal 150 may provide bicycle-related care contents such as country roads and may recommend "making a bicycle out of millet stalks" as a linked activity; with respect to a user of an XR device that has a large reaction to a ship (example 2), the manager terminal 150 may curate sea-related care contents and may recommend "an activity for making a ship out of millet stalks" as a linked activity; and, the manager terminal 150 may customize (e.g., this may be implemented with only the feedback data without personal identification information) the optimal image, which is obtained by combining the viewer's memory, by aggregating feedback data (example 3).

The linked activity region of the function region 1220 may be a region in which a user wearing the XR device 100 provides information about a recommended linked activity suitable for the purpose of the care contents after viewing the care contents thus currently viewed. In this case, the manager terminal 150 may list and provide a list of recommended linked activities and guide images in advance such that the linked activity is capable of being smoothly or seamlessly provided at an appropriate time after the care contents already provided, and may operate depending on the user's selection. The linked activities may include various activities such as stacking matches (it is possible to evaluate the sense of balance, the usage of fine muscle, or the like), making fried-flower cookies, pasting pieces (evaluated by using the number, filled area, or the like), cutting out example drawings and making a shape, origami, or the like, but are not particularly limited thereto. In the meantime, the linked activity may also be provided in a form of XR contents provided in the XR space through the XR device 100 rather than offline, and may also be implemented through an interaction reaction through communication between the manager terminal 150 and the XR device 100.

Contents regarding a method of making fried-flower cookies may be provided as the linked activity contents. For example, when an item of 'making fried-flower cookies beginner' is selected from the linked activity list, a video of making fried-flower cookies or text data of making fried-flower cookies may be provided.

Besides, in addition to recommending or providing customized or specialized contents described in this specification, the processing of various types of data, detected data, or extracted data may be caused from the result of machine learning of the artificial intelligence (AI) learning model generated by using the data as training data.

The manager terminal 150 may provide a service regarding the playback control of the care contents of at least one or more the XR devices 100 registered in the manager terminal 150 according to an embodiment of the inventive concept in a form of an application or a web service.

An interaction between the manager terminal 150 and the XR devices at a system level will be described with reference to FIG. 3 as follows.

In operation 11, the manager terminal 150 registers at least one or more XR devices when there is a registration request from the at least one or more XR devices.

In operation 12, the manager terminal 150 transmits a care content playback command to each of the registered XR devices. In this case, the manager terminal 150 may transmit the content playback command to only one or more specific XR devices and may transmit the content playback command to all of the XR devices registered in a broadcasting method. In the former case, for example, while the first XR devices for dementia patients and the second XR devices for cancer patients are already registered, to play the care contents for dementia patients, the manager terminal 150 may transmit a control signal such that the care contents is capable of being played in only the first XR devices. In this case, the manager terminal 150 may register and identify identifier information of each XR device in advance when registering the XR device in the manager terminal 150, and may allow only the first XR devices to play care contents, by displaying and broadcasting the identifier information for identifying the first XR device in a frame header of the signal when the control signal is transmitted.

When the control signal of the manager terminal 150 is received, the XR device 100 parses the control signal. In operation 13, when it is determined that the control signal is a care content playback command, the XR device 100 provides care contents to a user in an XR space depending on the determination result.

When the care contents is provided, in operation 14, the XR device 100 may extract and generate gaze coordinate data and may transmit the gaze coordinate data to the manager terminal 150. In this case, the XR device 100 may also transmit user feedback data to the manager terminal 150 together.

When predetermined data is received from the XR device 100 in operation 14, in operation 15, the manager terminal 150 may generate a playback control signal based on the predetermined data and may control the playback of the care contents being played in the corresponding XR device.

Next, FIGS. 4 to 10 will be described based on an operation of the manager terminal 150 (or the processor 220). In the meantime, FIGS. 4 to 10 may correspond to detailed embodiments of an operation after FIG. 3 or operation 14 of FIG. 3.

Hereinafter, it is described that the manager terminal 150 controls at least one or more pre-registered XR devices. For convenience of description, even when only the 'XR device' is described, it may mean one specific XR device or a plurality of XR devices depending on the meaning of a context.

Figure 4:
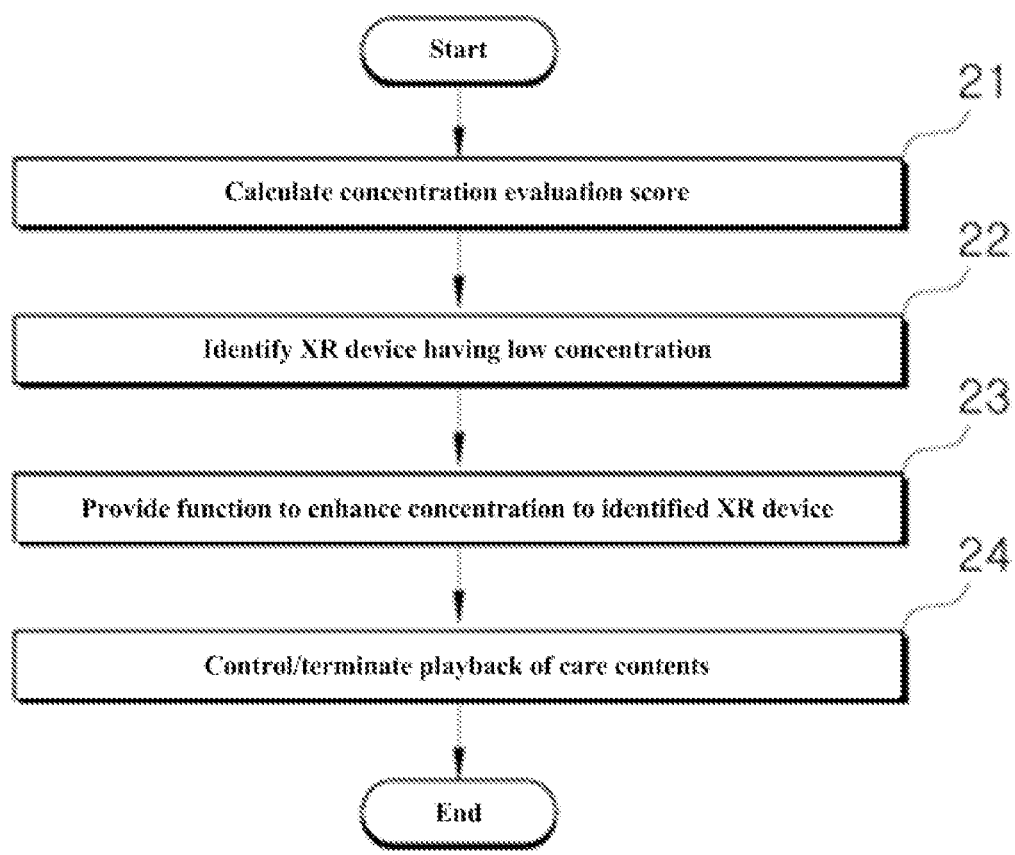
FIGS. 4 to 10 are flowcharts illustrating an operation of managing and controlling a concentration of each registered XR device in a manager terminal, according to an embodiment of the inventive concept.

First of all, referring to FIG. 4, in operation 21, the manager terminal 150 may calculate a concentration evaluation score of each XR device.

In operation 22, the manager terminal 150 may identify an XR device having a low concentration based on the calculated concentration evaluation score of each XR device.

In operation 23, the manager terminal 150 may provide a function to enhance the concentration to an XR device identified as the XR device having the low concentration.

In operation 24, the manager terminal 150 may control or terminate the playback of care contents of an XR device.

Operation 23 may be one of playback control operations given in operation 24.

As mentioned above, FIG. 5 shows that a concentration is determined when care contents are contents repeatedly played at a specific period or series.

Figure 5:
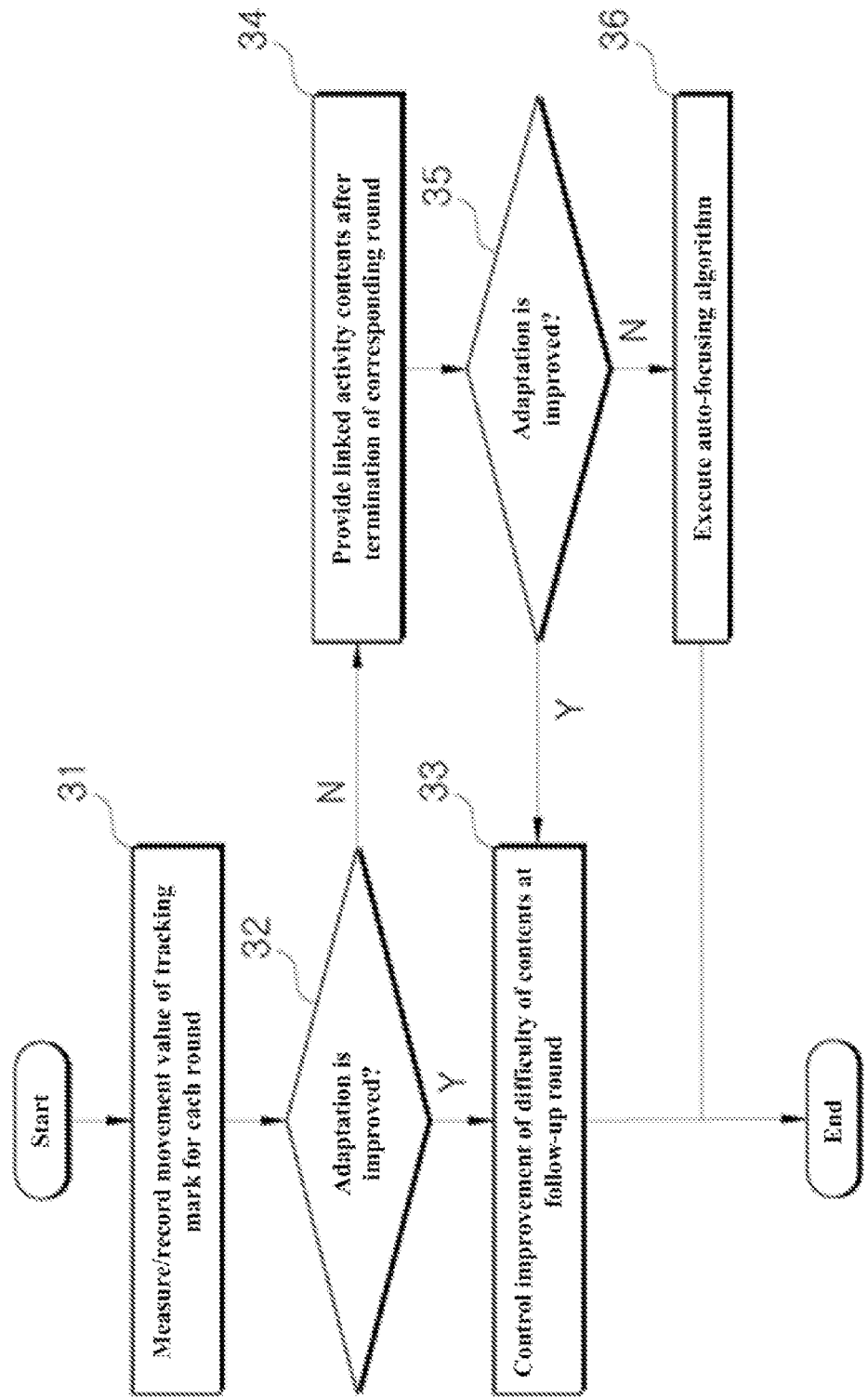

Referring to FIG. 5, in operation 31, the manager terminal 150 may measure and record a movement data value of a tracking mark for each round.

In operation 32, the manager terminal 150 may determine whether the content adaptation or viewing adaptation of a user of an XR device is improved, based on the measured movement data value of the tracking mark.

In operation 33, when the determination result in operation 32 indicates that it is determined that the content adaptation or viewing adaptation of the user of the XR device is improved, the manager terminal 150 may improve the difficulty of follow-up contents and may allow the XR device to provide care contents having improved difficulty compared to the previous round.

In operation 34, when the determination result in operation 32 indicates that it is not determined that the content adaptation of the user of the XR device is improved, the manager terminal 150 provides linked activity contents after the termination of the corresponding round.

In operation 35, the manager terminal 150 may re-determine whether the content adaptation of the user of the XR device is improved, depending on the linked activity contents provided in operation 34. In this case, whether the content adaptation is improved may be re-determined based on feedback data obtained by providing the linked activity contents or the measurement result of a tracking mark movement value of follow-up care contents after the linked activity contents are provided.

When the re-determination result in operation 35 indicates that it is determined that the content adaptation of the user of the XR device is improved, the manager terminal 150 may perform an operation as in operation 33. Nevertheless, when the content adaptation of the user of the XR device is still not improved, in operation 36, the manager terminal 150 may execute an auto-focusing algorithm. Before executing the auto-focusing algorithm in operation 36, the manager terminal 150 may repeat above-described operation 31 to operation 35 one or more times. Alternatively, even after repeating operation 31 to operation 35 or applying the auto-focusing algorithm, the manager terminal 150 re-performs the operations shown in FIG. 5. When it is determined that the adaptation is still not improved, the manager terminal 150 may allow the XR device to restart from round 1 of the corresponding care contents regardless of the playback round of the care contents so far or to play care contents having a relatively low difficulty of the overall contents.

Figure 6:
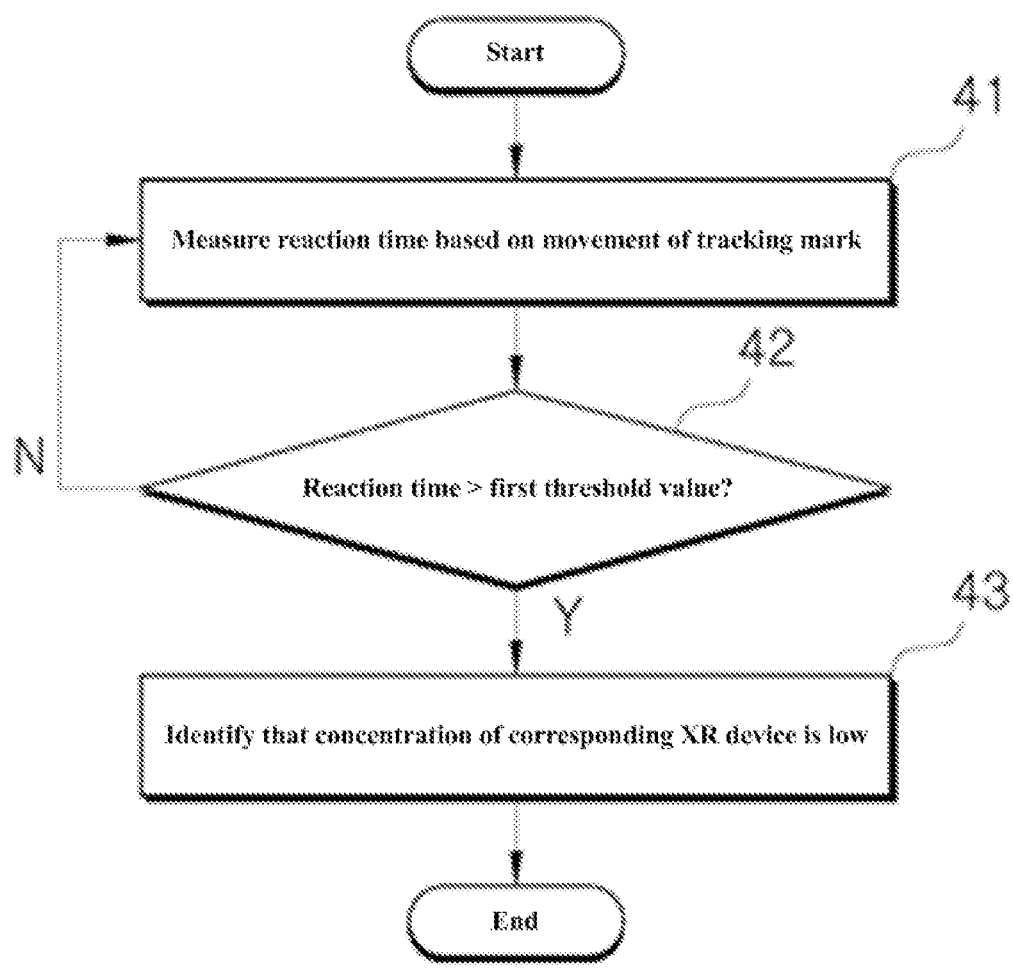

FIG. 6 is an embodiment in which a concentration is determined by using a reaction time based on a movement of a tracking mark.

Referring to FIG. 6, in operation 41, the manager terminal 150 may measure the movement of the tracking mark, that is, a movement-based reaction time. In this case, for example, the measured reaction time may be a reaction time according to the provision of an induction voice, an induction mark, an induction box (or a target box to be described later), or the like provided by the manager terminal 150. For example, the induction voice may be a voice command such as "selecting a specific object in a screen of contents currently played, moving to a specific region, and moving to a specific extent in the up, down, left, or right direction". The induction mark may be used to move to a specific region or to select a specific object by providing a separate image, such as a dot or a character (photos of acquaintances or family members, cute characters, or the like).

In operation 42, the manager terminal 150 may compare the measured reaction time with a first threshold value (a threshold time) and then may determine the comparison result.

In operation 43, when the determination result in operation 32 indicates that the measured reaction time exceeds the first threshold value (e.g., 3 seconds, or the like), the manager terminal 150 may identify that the concentration of a user of the corresponding XR device is low. This identification may be reflected to calculating a concentration evaluation score with reference to a predetermined weight with regard to the reaction time of FIG. 6.

Figure 7:
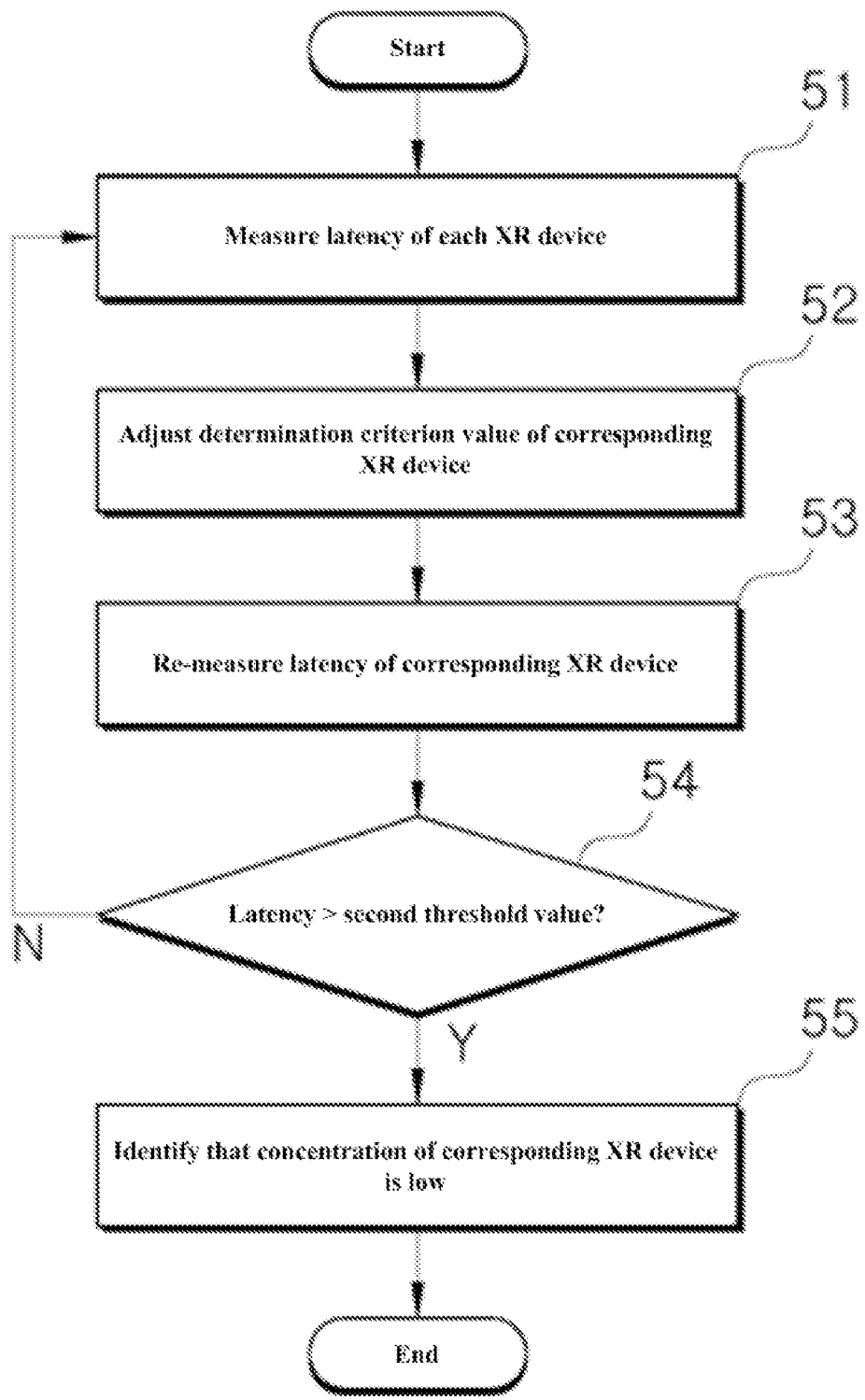

FIG. 7 is an embodiment in which a concentration is determined by using latency of each XR device.

Referring to FIG. 7, in operation 51, the manager terminal 150 may measure the latency of each XR device.

In operation 52, the manager terminal 150 may adjust a determination criterion value of the corresponding XR device with reference to the measured latency of each XR device. In this case, the manager terminal 150 may calculate the determination criterion value by reflecting the latency information of each XR device. For example, the manager terminal 150 may set +/− time for the determination criterion value of the XR device in which care contents are being relatively slowly played.

In operation 53, the manager terminal 150 may re-measure the latency of each XR device.

In operation 54, the manager terminal 150 may compare the latency re-measured for each XR device with a second threshold value and may determine the comparison result.

When the determination result in operation 54 indicates the re-measurement latency of a specific XR device exceeds the second threshold value, in operation 55, the manager terminal 150 may identify that the concentration of a user of the corresponding XR device is low. Likewise, this identification may be reflected to calculating a concentration evaluation score with reference to a predetermined weight with regard to the latency of FIG. 7.

Figure 8:
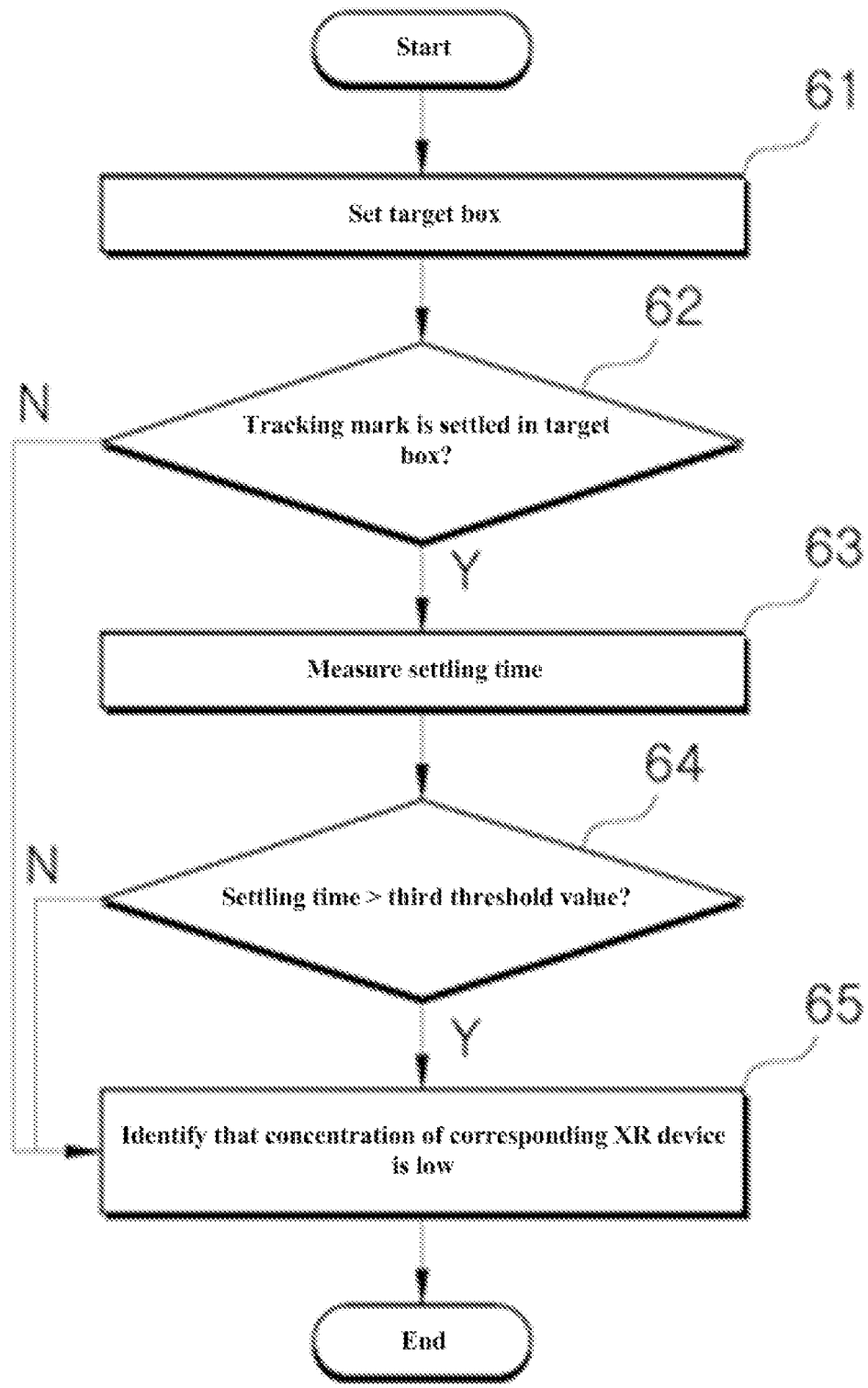

FIG. 8 is an embodiment in which a concentration is determined by using a target box.

Referring to FIG. 8, in operation 61, the manager terminal 150 may set and provide a target box. In this case, an arbitrary region of care contents being played in each XR device may be set for the target box. For example, the arbitrary region may be a specific object in the corresponding playback screen or a region including the same. According to an embodiment, for example, the arbitrary region may be set at a location spaced by a predetermined distance from a tracking mark of which location information in a current playback screen is calculated. According to another embodiment, the target box may be in a form of a polygon such as a rectangle, circle, or triangle or may be in a form of a point or a line. According to still another embodiment, a sub-box identified in a box such as an archery target is present in the target box. As the tracking mark is moved from the outside to the center of the target box, a high score is set for each sub-box. Finally, the score may be calculated differently depending on a location of the tracking mark in a region in the target box.

In operation 62, the manager terminal 150 may determine whether the tracking mark is settled in the target box.

When the determination result in operation 62 indicates that the tracking mark is settled in the target box, in operation 63, the manager terminal 150 may measure a time required from the provision of the target box to the final settling in the target box. In this case, for example, it may be determined that the settling is successful only when the tracking mark is positioned in the target box and stays during a predetermined time (at least 0.5 seconds). For example, the settling may be defined differently depending on the type of care contents. For example, when care contents are used for dementia patients, it may be relatively difficult to fix a tracking mark at a specific point during a predetermined time. In this case, for example, it may be determined that the settling is successful when the tracking mark simply passes the target box.

In operation 64, the manager terminal 150 may compare the settling time measured in the operation 63 with a third threshold value.

When the determination result in operation 64 indicates that the settling time of the tracking mark of the corresponding XR device to the target box exceeds the third threshold value, in operation 65, the manager terminal 150 may identify that the concentration of a user of the corresponding XR device is low. Likewise, this identification may be reflected to calculating a concentration evaluation score with reference to a predetermined weight with regard to the target box of FIG. 8. According to an embodiment, regardless of the settling time, the manager terminal 150 may evaluate the concentration based on whether the tracking mark is settled.

Figure 9:
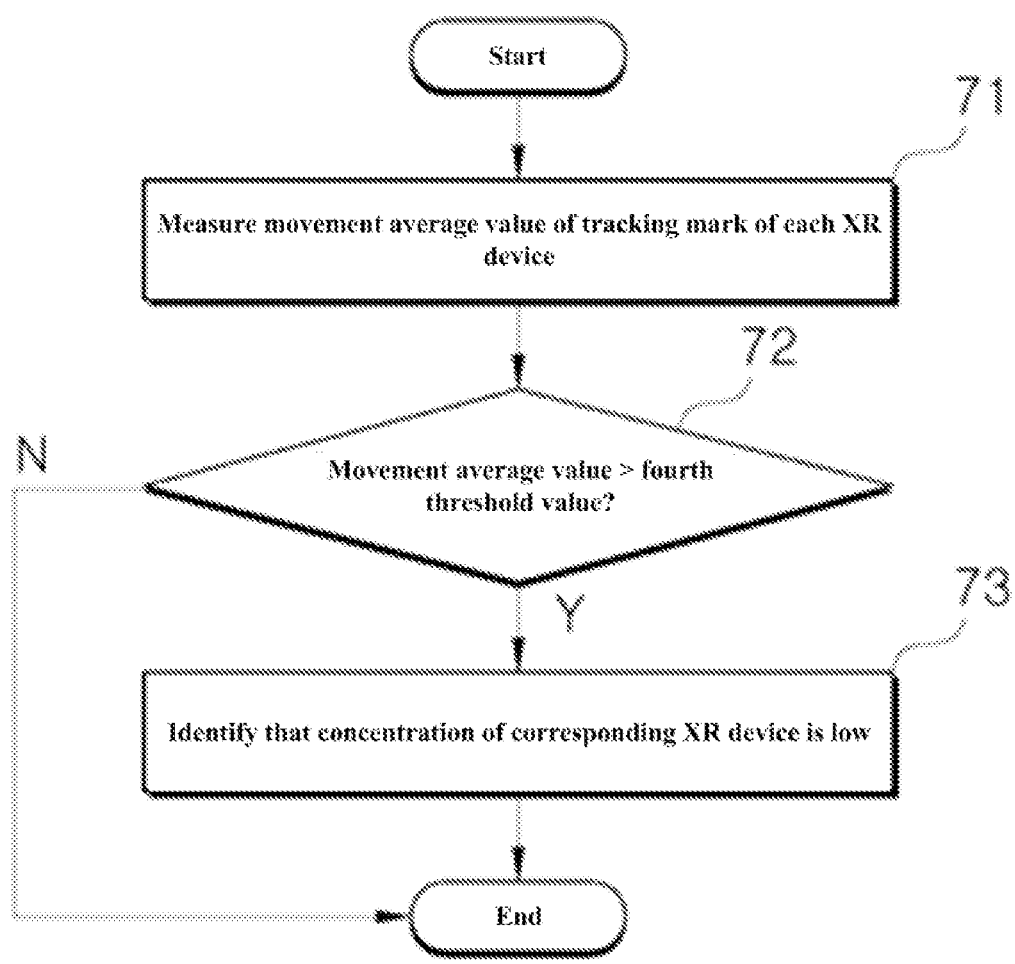

FIG. 9 is an embodiment in which a concentration is determined by using a movement average value of a tracking mark.

Referring to FIG. 9, in operation 71, the manager terminal 150 may measure a movement average value of a tracking mark of each XR device. Here, the movement average value of the tracking mark of each XR device may indicate the movement average value during the entire playback time of the corresponding contents. In this case, when the playback of the corresponding contents in an XR device is stopped in the middle, the movement average value of the tracking mark may also indicate the movement average value of the tracking mark up to that point. On the other hand, when the playback of the corresponding contents is paused in the XR device and then played again, the movement average value of the tracking mark may indicate a movement average value of the tracking mark, excluding a time required to play the contents again after the pause. According to an embodiment, the movement average value of the tracking mark of each XR device may indicate the movement average value of the tracking mark in a predetermined playback section among the entire playback section of the corresponding contents. The predetermined playback section may be at least one or more of an initial section from a playback start point, a section before a playback end point, a section before and after an important object appears, a section set by the manager terminal 150, or an abrupt section.

In operation 72, the manager terminal 150 may compare the movement average value of the tracking mark of the XR device measured in operation 71 with a fourth threshold value and may determine the comparison result.

In operation 73, the manager terminal 150 may determine that an XR device, in which the determination result in operation 72 indicates that the movement average value of the tracking mark exceeds the fourth threshold value, is a device having a relatively low concentration. Likewise, this identification may be reflected to calculating a concentration evaluation score with reference to a predetermined weight with regard to the movement average value of the tracking mark of FIG. 9.

Figure 10:
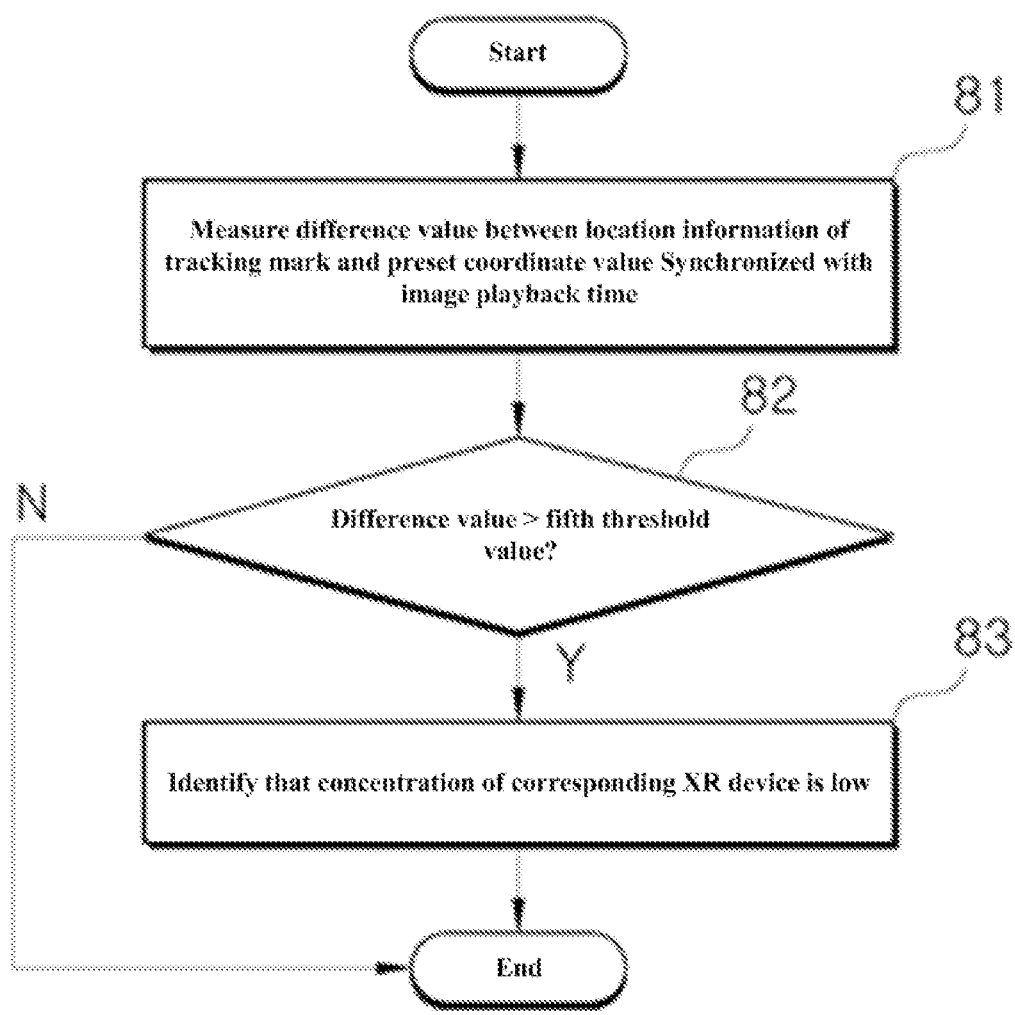

FIG. 10 is an embodiment in which a concentration is determined by using a preset coordinate value.

Referring to FIG. 10, in operation 81, the manager terminal 150 may measure location information of a current tracking mark of each XR device and may measure a difference value from the provided preset. Here, the preset may be synchronized with an image playback time by the manager terminal 150. Accordingly, the manager terminal 150 may measure a distance (coordinate) difference value between a coordinate value of the provided preset and the measured location information (i.e., a coordinate value) of the tracking mark of each XR device. In the meantime, the preset may indicate a location of a user's tracking mark in contents being played at the corresponding time and may be provided at a predefined location. The reason is that the concentration is properly determined. In that respect, the preset may be used to set a location to which an important object belongs in an important section.

In operation 82, the manager terminal 150 may compare the measured difference value with a fifth threshold value and may determine the comparison result.

When the determination result in operation 82 indicates that the difference value measured for a specific XR device exceeds the fifth threshold value, in operation 83, the manager terminal 150 may identify that the concentration of the corresponding XR device is low. Likewise, this identification may be reflected to calculating a concentration evaluation score with reference to a predetermined weight with regard to a location information difference from a tracking mark according to the preset provision of FIG. 10.

FIGS. 11A to 13 show a user interface for managing and controlling a concentration for each of XR devices registered in the manager terminal 150, according to an embodiment of the inventive concept.

Figure 11A:
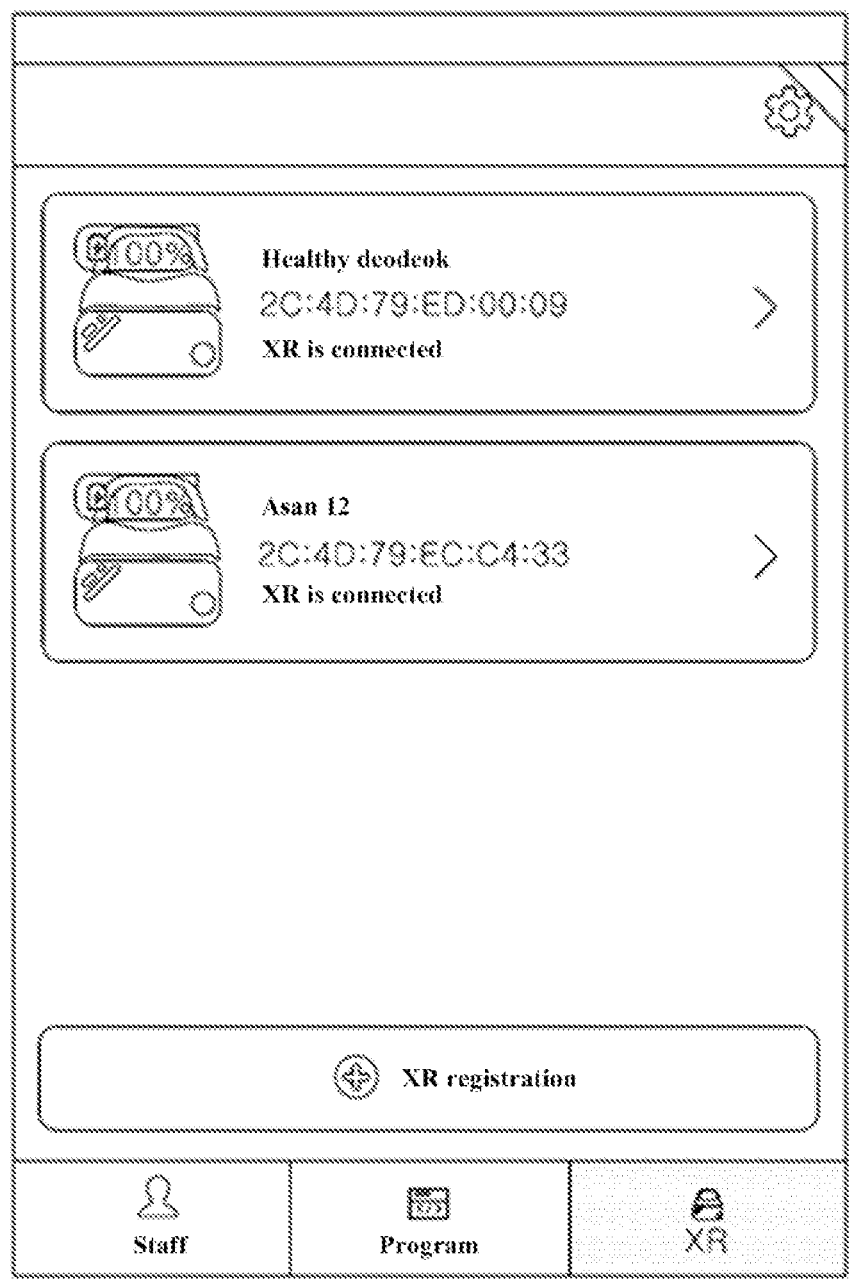
FIGS. 11A to 13 are views illustrating screens of a user interface for describing an operation of a manager terminal for concentration management and control of an XR device, according to an embodiment of the inventive concept.

It is understood from FIG. 11A that registration of an XR device and a list of registered XR devices are provided.

Figure 11B:
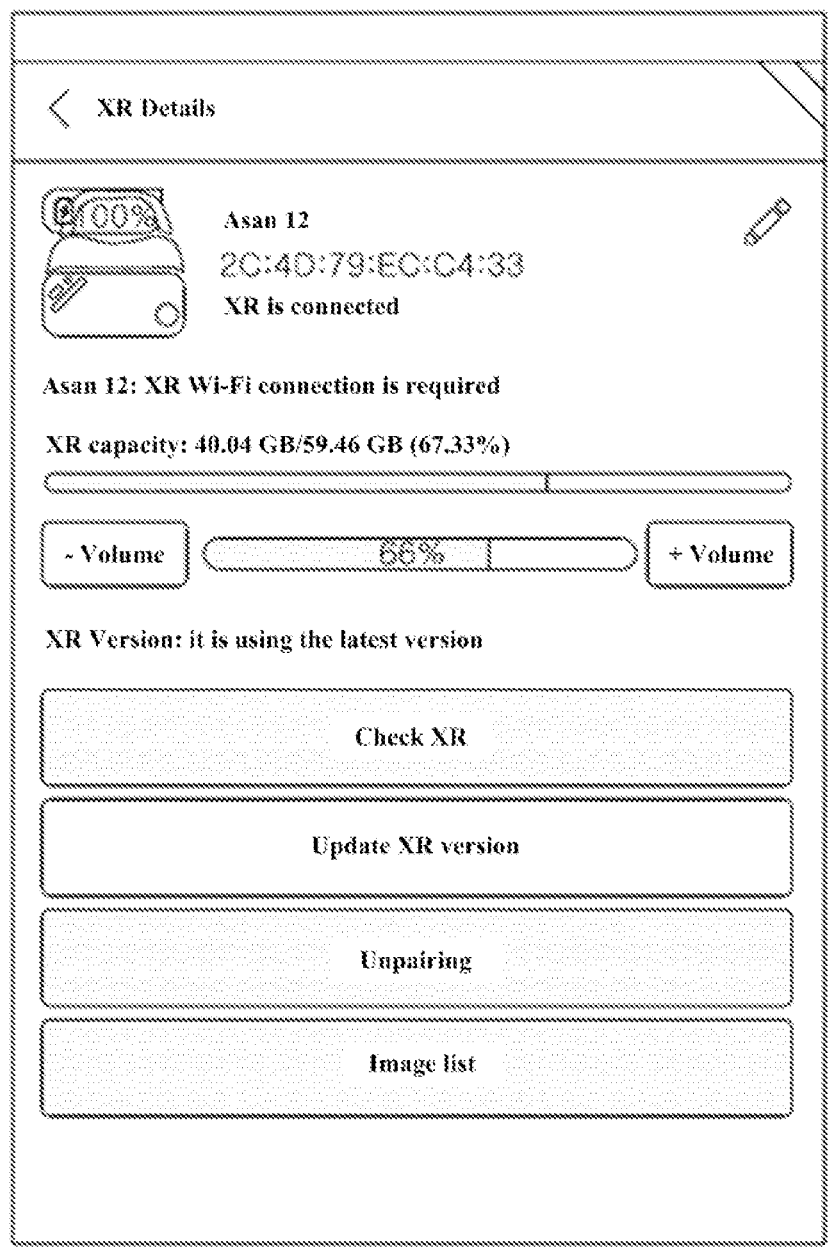

It is understood from FIG. 11B that detailed information about a specific XR device is provided before or after registration. FIG. 11B illustrates a user interface related to control such as checking, updating a version, pairing and unpairing, and an image list.

As described above, in FIG. 12A, the image playback region 1210 of the registered XR devices may be output, and a function item related to an image description, a question list, and a linked activity list may be provided to the function region 1220.

FIG. 12B shows a screen in which a question related to contents currently being played or a question list synchronized with a current playback section is provided when the question list is selected in FIG. 12A.

In FIG. 13, for example, the two tracking marks 1321 and 1322 are provided in the image playback region. Unlike illustrations in FIGS. 12A and 12B, a function to control a specific XR device may be provided depending on a concentration evaluation. For example, together with a playback bar, a playback location control item (+10 seconds, −10 seconds, or the like), full shutdown, a pause, an original location item, an item for providing identification information of the corresponding control target XR device, a volume up/down item of the corresponding control target XR device, or the like may be provided to a concentration evaluation function region 1310.

In the meantime, the concentration evaluation function region 1310 may be provided in a form of a scroll bar and may be provided to select a specific control target XR device or to select all the XR devices as control target XR devices. Alternatively, although not shown, when there are a plurality of control target XR devices, a content playback screen and the concentration evaluation function region 1310 may be divided through screen division and may be provided to be simultaneously controlled and identified.

The manager terminal 150 may identify a current playback location of each XR device and may control the content playback speed of each XR device such that content playback locations of all the XR devices are matched with each other based on the current playback location of the identified respective XR device. When the content playback locations of all XR devices are matched with each other in this way, the concentration according to an embodiment of the inventive concept may be evaluated. However, an embodiment is not necessarily limited thereto.

In the meantime, for example, when controlling the playback speed of each XR device, the manager terminal 150 may individually control the playback speed of each XR device such that playback locations of all of the XR devices reach, within a predetermined time, a playback location corresponding to a starting point of one of i) the next diagnosis section of a diagnosis section to which the playback location of the XR device having the latest playback location thus currently identified belongs, ii) the next diagnosis section of a diagnosis section to which the playback location of the XR device having the earliest playback location thus currently identified belongs, and iii) the next diagnosis section of a diagnosis section to which an average playback location of the identified current playback locations of all of the XR devices belongs.

In the meantime, according to an embodiment of the inventive concept, the care contents in which a plurality of diagnosis sections are preset and identified will be described In an embodiment, the plurality of diagnosis sections in the care contents may be divided into a critical diagnosis section and a non-critical diagnosis section depending on the importance of contents provided in the corresponding diagnosis section. Furthermore, sizes of the critical diagnosis section and the non-critical diagnosis section may not be uniform within the corresponding care contents.

When there are a plurality of XR devices, which have a relatively low concentration depending on the determined concentration evaluation, from among a plurality of XR devices, the manager terminal 150 may simultaneously group the corresponding XR devices and may manage and control the grouped XR devices at the same time. The manager terminal 150 may group tracking marks of the grouped XR devices and may process the grouped tracking marks so as to be identified depending on a group. In this case, tracking marks of the ungrouped XR device(s) and tracking marks of the grouped XR devices may be differentiated and output to be distinguishable from each other. The differentiation method may be made in various ways, such as the size, color, flickering, and grouping display of a tracking mark.

When there is no movement of a tracking mark (e.g., 3 seconds or more), the manager terminal 150 may not unconditionally evaluate the concentration to be low, but may identify a location of the tracking mark. When the location of the tracking mark corresponds to the location of a specific object (a person, a place, an object, a specified location, or the like), the manager terminal 150 may not evaluate the concentration to be low. On the other hand, when the location of the corresponding tracking mark corresponds to an empty space without an object or continues to position a location where no special meaning is given, the manager terminal 150 may determine that the concentration is low.

The manager terminal 150 may identify locations of current tracking marks of all of the registered XR devices, and may determine that the concentration of the corresponding XR device of a tracking mark, which is present at a location significantly far away from a tracking mark of the identified respective XR device, is low. Alternatively, in the determination process, the manager terminal 150 may calculate an average value of the identified tracking mark of each XR device and may determine that an XR device having a difference by a threshold value or more from the average value is an XR device with a low concentration.

According to an embodiment, the order of operations may be different from the order shown in FIGS. 3 to 10, or some operations may be performed simultaneously.

Besides, the embodiments of FIGS. 3 to 10 may be combined within an operating range that does not conflict with each other to generate a new embodiment.

According to an embodiment of the inventive concept, the intended effects may be maximized through care contents of an XR device by managing and controlling a user's concentration of a registered XR device that is playing the care contents.

Steps or operations of the method or algorithm described with regard to an embodiment of the inventive concept may be implemented directly in hardware, may be implemented with a software module executable by hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the inventive concept pertains.

Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

What is claimed is:

1. A method for managing and controlling a plurality of registered extended reality (XR) devices depending on a concentration of a user in a manager terminal, the method comprising:

transmitting a care content playback command to each of the XR devices;

receiving gaze coordinate data of the user, who views care contents being played, from each of the XR devices;

outputting the care contents being played in each of the XR devices, and a tracking mark based on the received gaze coordinate data of the user on a screen; and transmitting a control signal to a corresponding XR device depending on the concentration of the user of each of the XR devices, wherein the concentration of the user of each of the XR devices is determined based on a difference value between a coordinate value of a current tracking mark of each of the XR devices and a coordinate value of a predefined preset synchronized with a playback time of the care contents, wherein, when the care contents are contents repeatedly played at a specific period or series, the concentration of the user of each of the XR devices is determined by using content adaptation determined based on movement data of a tracking mark for each round, and an average value of the movement data, wherein the average value indicates the average value of the movement data of the tracking mark in an entire playback section or a predetermined playback section among the entire playback section, wherein the predetermined playback section includes at least one of an initial section from a playback start point, a specific section before the playback end point, a specific section before and after an important object appears, a specific section set by the manager terminal, or an abrupt section, wherein the concentration of the user of each of the XR devices is determined further with reference to latency information of each of the XR devices, wherein the care contents are set such that a plurality of diagnosis sections including a critical diagnosis section and a non-critical diagnosis section, of which sizes are not uniform, are included depending on an importance, and wherein the manager terminal is configured to:

when information about a playback location of each of the XR devices is currently received, control a content playback speed of each of the XR devices such that content playback locations of all of the XR devices are matched with each other and thus the concentration of the user is collectively managed;

when the content playback locations of all the XR devices are matched with each other, control a start of concentration determination of the user; and individually control a playback speed of each of the XR devices such that playback locations of all the XR devices reach, within a predetermined time, a playback location corresponding to a starting point of one diagnosis section of a next diagnosis section of a diagnosis section to which the playback location of an XR device having the latest playback location thus currently received belongs, a next diagnosis section of a diagnosis section to which the playback location of an XR device having the earliest playback location thus currently received belongs, and a next diagnosis section of a diagnosis section to which an average playback location of playback locations, which are currently received, for all of the XR devices belongs.

2. The method of claim 1, wherein the movement data of the tracking mark for each round of the care contents is calculated with reference to reaction time data according to a movement of the tracking mark according to provision of an induction voice, and an adjustment of a criterion value for determining a latency for each XR device.

3. The method of claim 2, further comprising:
providing a target box in an arbitrary region in a playback screen of the care contents; and
measuring a movement from a location of a current tracking mark to the provided target box and a movement time.

4. The method of claim 3, wherein the arbitrary region is set within a predetermined distance based on a location of the current tracking mark thus identified.

5. The method of claim 3, wherein the arbitrary region is set to include a predetermined object in the playback screen of the care contents.

6. The method of claim 1, wherein the manager terminal is configured to:
determine whether adaptation is improved, on a basis of concentration evaluation based on the movement data of the tracking mark for each round;
when it is not determined that the adaptation is improved, provide linked activity contents after a playback end of a corresponding round;
after providing the linked activity contents, re-determine whether the adaptation is improved; and
when the re-determination result indicates it is determined that the adaptation is not improved, execute an auto-focusing algorithm.

7. A manager terminal for managing and controlling a plurality of registered XR devices depending on a concentration of a user, the manager terminal comprising:
a memory; and
a processor,
wherein the processor is configured to:
transmit a care content playback command to each of the XR devices;
receive gaze coordinate data of the user, who views care contents being played, from each of the XR devices;
output the care contents being played in each of the XR devices, and a tracking mark based on the received gaze coordinate data of the user on a screen; and
transmit a control signal to a corresponding XR device depending on the concentration of the user of each of the XR devices,
wherein the concentration of the user of each of the XR devices is determined based on a difference value between a coordinate value of a current tracking mark of each of the XR devices and a coordinate value of a predefined preset synchronized with a playback time of the care contents,
wherein, when the care contents are contents repeatedly played at a specific period or series, the concentration of the user of each of the XR devices is determined by using content adaptation determined based on movement data of a tracking mark for each round, and an average value of the movement data,
wherein the average value indicates the average value of the movement data of the tracking mark in an entire playback section or a predetermined playback section among the entire playback section,
wherein the predetermined playback section includes at least one of an initial section from a playback start point, a specific section before the playback end point, a specific section before and after an important object appears, a specific section set by the manager terminal, or an abrupt section,
wherein the concentration of the user of each of the XR devices is determined further with reference to latency information of each of the XR devices,
wherein the care contents are set such that a plurality of diagnosis sections including a critical diagnosis section and a non-critical diagnosis section, of which sizes are not uniform, are included depending on an importance, and
wherein the processor is configured to:
when information about a playback location of each of the XR devices is currently received, control a content playback speed of each of the XR devices such that content playback locations of all of the XR devices are matched with each other and thus the concentration of the user is collectively managed;
when the content playback locations of all the XR devices are matched with each other, control a start of concentration determination of the user; and
individually control a playback speed of each of the XR devices such that playback locations of all the XR devices reach, within a predetermined time, a playback location corresponding to a starting point of one diagnosis section of a next diagnosis section of a diagnosis section to which the playback location of an XR device having the latest playback location thus currently received belongs, a next diagnosis section of a diagnosis section to which the playback location of an XR device having the earliest playback location thus currently received belongs, and a next diagnosis section of a diagnosis section to which an average playback location of playback locations, which are currently received, for all of the XR devices belongs.

8. The manager terminal of claim 7, wherein the movement data of the tracking mark for each round of the care contents is calculated with reference to reaction time data according to a movement of the tracking mark according to provision of an induction voice, and an adjustment of a criterion value for determining a latency for each XR device.

9. The manager terminal of claim 8, wherein the processor is configured to:
provide a target box in an arbitrary region in a playback screen of the care contents; and
measure a movement from a location of a current tracking mark to the provided target box and a movement time.

10. The manager terminal of claim 9, wherein the arbitrary region is set within a predetermined distance based on a location of the current tracking mark thus identified.

11. The manager terminal of claim 9, wherein the arbitrary region is set to include a predetermined object in the playback screen of the care contents.

12. The manager terminal of claim 7, wherein the processor is configured to:
determine whether adaptation is improved, on a basis of concentration evaluation based on the movement data of the tracking mark for each round;
when it is not determined that the adaptation is improved, provide linked activity contents after a playback end of a corresponding round;
after providing the linked activity contents, re-determine whether the adaptation is improved; and
when the re-determination result indicates it is determined that the adaptation is not improved, execute an auto-focusing algorithm.

13. A system comprising:
a plurality of XR devices, each of which plays care contents; and
a manager terminal, in which each of the XR devices are registered, and configured to manage and control each of the XR devices depending on a concentration of a user,
wherein the manager terminal is configured to:
transmit a care content playback command to each of the XR devices;
receive gaze coordinate data of the user, who views care contents being played, from each of the XR devices;
output the care contents being played in each of the XR devices, and a tracking mark based on the received gaze coordinate data of the user on a screen; and
transmit a control signal to a corresponding XR device depending on the concentration of the user of each of the XR devices,
wherein the concentration of the user of each of the XR devices is determined based on a difference value between a coordinate value of a current tracking mark of each of the XR devices and a coordinate value of a predefined preset synchronized with a playback time of the care contents, wherein, when the care contents are contents repeatedly played at a specific period or series, the concentration of the user of each of the XR devices is determined by using content adaptation determined based on movement data of a tracking mark for each round, and an average value of the movement data, wherein the average value indicates the average value of the movement data of the tracking mark in an entire playback section or a predetermined playback section among the entire playback section, wherein the predetermined playback section includes at least one of an initial section from a playback start point, a specific section before the playback end point, a specific section before and after an important object appears, a specific section set by the manager terminal, or an abrupt section, wherein the concentration of the user of each of the XR devices is determined further with reference to latency information of each of the XR devices, wherein the care contents are set such that a plurality of diagnosis sections including a critical diagnosis section and a non-critical diagnosis section, of which sizes are not uniform, are included depending on an importance, and wherein the manager terminal is configured to:

when information about a playback location of each of the XR devices is currently received, control a content playback speed of each of the XR devices such that content playback locations of all of the XR devices are matched with each other and thus the concentration of the user is collectively managed;

when the content playback locations of all the XR devices are matched with each other, control a start of concentration determination of the user; and individually control a playback speed of each of the XR devices such that playback locations of all the XR devices reach, within a predetermined time, a playback location corresponding to a starting point of one diagnosis section of a next diagnosis section of a diagnosis section to which the playback location of an XR device having the latest playback location thus currently received belongs, a next diagnosis section of a diagnosis section to which the playback location of an XR device having the earliest playback location thus currently received belongs, and a next diagnosis section of a diagnosis section to which an average playback location of playback locations, which are currently received, for all of the XR devices belongs.

* * * * *